Inventor
Hans P. Eichenberger

Jan. 16, 1962     H. P. EICHENBERGER     3,016,865
METHOD AND APPARATUS FOR REDUCING DRAG
ON SUBMERGED VEHICLES

Filed May 21, 1959     3 Sheets-Sheet 2

Inventor
Hans P. Eichenberger

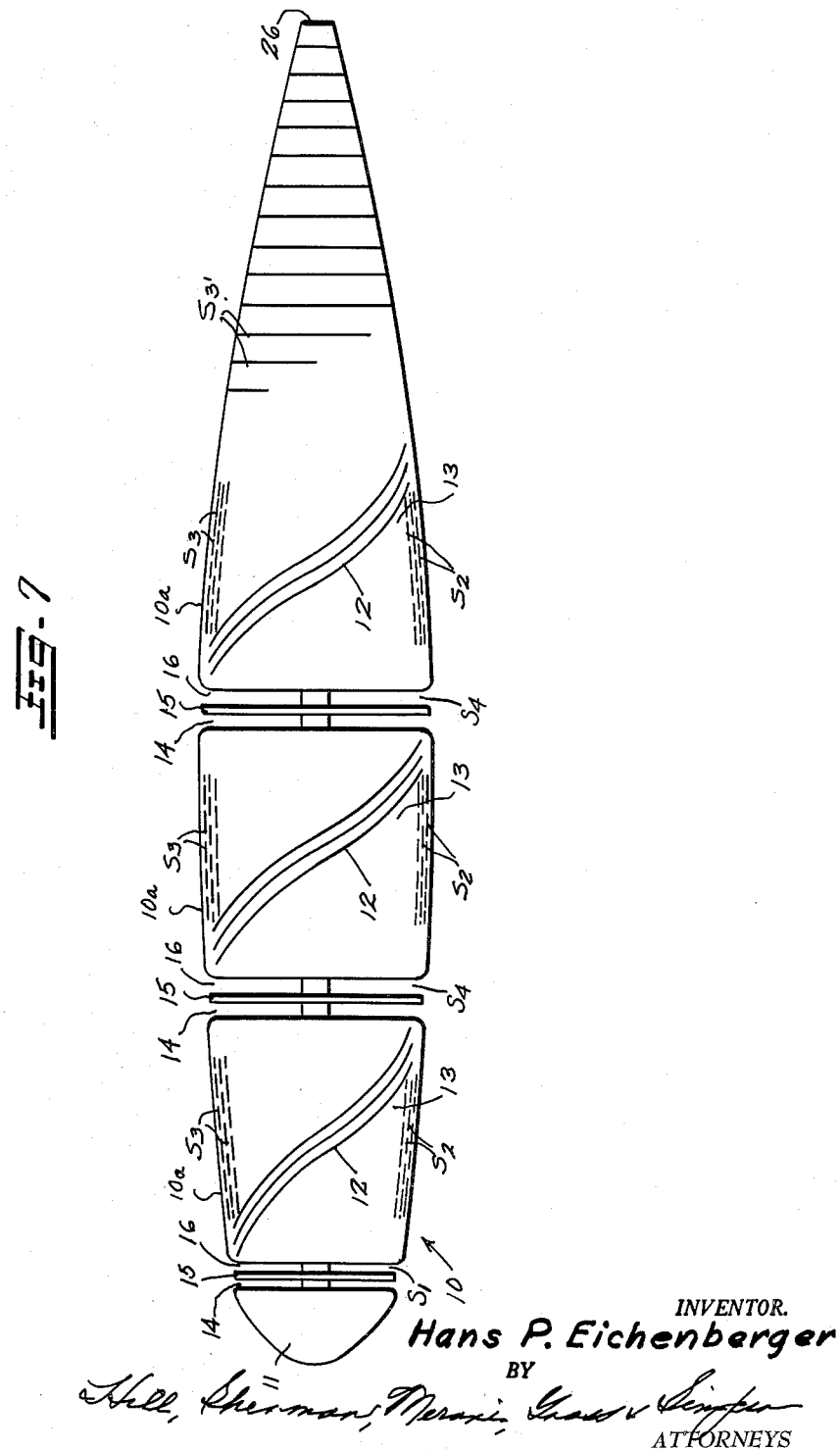

United States Patent Office 3,016,865
Patented Jan. 16, 1962

3,016,865
METHOD AND APPARATUS FOR REDUCING DRAG ON SUBMERGED VEHICLES
Hans P. Eichenberger, Cleveland, Ohio, assignor to Thompson Ramo Wooldridge Inc., Cleveland, Ohio, a corporation of Ohio
Filed May 21, 1959, Ser. No. 814,809
8 Claims. (Cl. 114—67)

This invention relates to a method and apparatus for reducing the drag of bodies or vehicles such as a torpedo or a submarine or the like submerged in a liquid such as water. More particularly, the invention relates to a method and apparatus for providing a many-fold reduction of such drag by stabilization of a laminar water boundary layer by a gas film introduced between the body and the surrounding liquid whereby the stabilization of the laminar water boundary layer also results in the stabilization of the water-gas interface.

In general, the drag of any body within a fluid, whether liquid or gas, may be classified into wave drag such as is present with surface ships and supersonic airplanes, form drag, and friction drag caused by the boundary layer buildup on the surface of the body. For bodies such as a submarine or torpedo which are fully immersed in a liquid such as water, the friction drag is the most important of the three types of drags while the form drag amounts to only about 5% of the friction drag and wave drag is entirely absent. For the purposes of this specification the word liquid with respect to the above classification is taken to mean any fluid which is not a gas. Furthermore, the term liquid and water will be used interchangeably although it is, of course, recognized that water is merely one common example of a liquid. The present invention is concerned primarily with the problems of drag in a liquid for the reason that the invention depends primarily on the interposition between a moving body and the ambient medium in which it is moving of a film or layer of gas which is of considerably lower viscosity than that of the surrounding medium. Where, as in the case of an airplane, the surrounding medium is itself a gas, the differences in viscosity which can be achieved by introducing another gas as the film are so small as to render the problems involved essentially of a different kind rather than of a different magnitude. However, while the term "gas" will be used in referring to the above noted film to be interposed between the body and its medium it should be realized that in some applications the usual meaning of the word gas (that is, a fluid which is not a liquid) is too restricted since, for our present purposes, the term should also include, and is used to include, liquids which have a substantially lower viscosity than the liquid in which the body is moving.

Many attempts have in the past been made to reduce the drag on bodies moving in various fluids. As noted above, the present invention is directed to a method and apparatus for reducing the drag on a body such as a torpedo or a submarine which is entirely immersed in and is moving in a liquid medium. It is one feature of the present invention to introduce gas on the surface of such a moving body in such a fashion that the velocity of the water at the water-gas interface is a fraction of the velocity of the body itself. This can, for example, be accomplished by injecting and/or absorbing the gas through porous walls or through individual slots on the surface of the body. It is also a feature of the present invention to adjust the gas sheet layer in such a fashion that the interface between the water and the gas is stable, that is, in such a fashion that the gas film does not break up into bubbles. The thickness of the gas film can be controlled or maintained by continually injecting gas and by removing a part of the existing gas layer through porous walls or slots. The stability of the gas-water interface can be improved also by the reduction of shear stress on this interface. One device for achieving such shear reduction is the provision of deflecting ridges or fins to deflect a portion of the gas film at an angle to the direction of the velocity of the body in a manner to be described in detail below.

It is a feature of the present invention to provide means for separating a body such as a torpedo or a submarine immersed in a liquid from that liquid by a gas film in such a fashion as to maintain the stability of a laminar liquid boundary layer and the stability of the interface between the gas and the liquid. Such a stable interface and boundary layer between a gas film and the ambient liquid medium can reduce the drag on such a body by as much as a hundred-fold and hence result in a concomitant reduction in the propulsive power requirement per unit weight and at the same time afford a many-fold reduction of the noise transmitted from the body to the ambient liquid medium. In order to achieve these results, however, it has been found that the mere provision of a gas film as such is not sufficient. It is essential that the gas-liquid interface be maintained in a stable state.

It is therefore an object of this invention to provide a method and apparatus for reducing the drag of a body submerged in and moving in a liquid.

It is a more specific object of this invention to provide such a method and apparatus for reducing drag by interposing a gas film between the body and the liquid and maintaining this film in such condition as to stabilize the laminar liquid boundary layer and the liquid-gas interface.

It is a further object of this invention to provide a method and apparatus for reducing the drag of a body submerged and moving in a first fluid of relatively high viscosity by interposing between said body and said first fluid a film of a second fluid of relatively low viscosity in such a fashion as to stabilize a laminar boundary layer of said first fluid and to stabilize the interface between said fluids.

It is a further object of this invention to provide such a method and apparatus for reducing drag wherein the shear stress acting on the interface is reduced to a minimum.

It is a further object of this invention to provide such a method and apparatus for reducing drag wherein the thickness of a gas film interposed between a submerged moving body and the liquid medium through which it is moving is maintained at a desired value by introducing such gas through one set of openings and withdrawing said gas through another set of openings and continuously recirculating said gas.

Other objects, features, and advantages of the present invention will be more fully apparent to those skilled in the art from the following detailed description taken in connection with the accompanying drawings in which like reference characters refer to like parts throughout and wherein:

FIGURE 7 is a diagrammatic longitudinal sectional view (parts being shown in exaggerated size and not to scale for the sake of clarity) of an elongated vehicle constructed in accordance with the present invention.

As noted above, the present invention is directed to a method and apparatus for reducing the drag of a body such as a vehicle submerged in an ambient fluid by a factor of many times and in some instances as great as 100 times by stabilization of the laminar boundary layer of the fluid by a film of a fluid of substantially lower viscosity such as a gas. The stabilization of the laminar water boundary layer results also in the stabilization of the water-gas interface. The method of the present invention is more easily applied where the Reynolds number for the body or vehicle is small. In this sense, the Reynolds number for the body may be defined as being equal to the velocity of the body times the length of the body, the product being divided by the kinematic viscosity of the water or other fluid medium in which the body moves. It is thus apparent that the method is particularly suitable for application to torpedoes where this Reynolds number of the body is small.

There are essentially two conditions which are necessary to insure the stability of the water boundary layer and the gas interface therewith. The first of these conditions is that the streamlines forming the interface between the gas and the water have to be concave seen from the gas side in such a fashion that the total body force acting on the water is away from the gas. The body force per unit mass acting on the water is the vector sum of the centrifugal force and the gravity. As is well known, the centrifugal force is equal to $(V^2R)$ where V is the water velocity and R is the radius of curvature of the surface of the body or vehicle.

The second condition necessary to stability is that the water boundary layer be kept sufficiently small so that it will remain stable. By a small boundary layer is meant one in which the Reynolds number, defined for this purpose by $(Vd/N)$ where V is the water velocity, $d$ is the displacement thickness of the water boundary layer and N is the kinematic liquid or water viscosity, is small. This Reynolds number for the fluid should be of the order of 100 or smaller. This second condition of maintaining a relatively small fluid Reynolds number can be achieved by providing devices such that only a small shear stress acts on the gas-water interface and as a result of this, almost no boundary layer is formed in the water. An example of such a device will be described in detail below.

Many different types of constructions of apparatus are suitable for bodies or vehicles such as torpedoes which may be used in order to achieve the two basic conditions for stable laminar flow discussed above, namely, concave streamlines and minimized shear forces. These constructions will vary according to the speed and size required of the underwater body.

Figure 4:
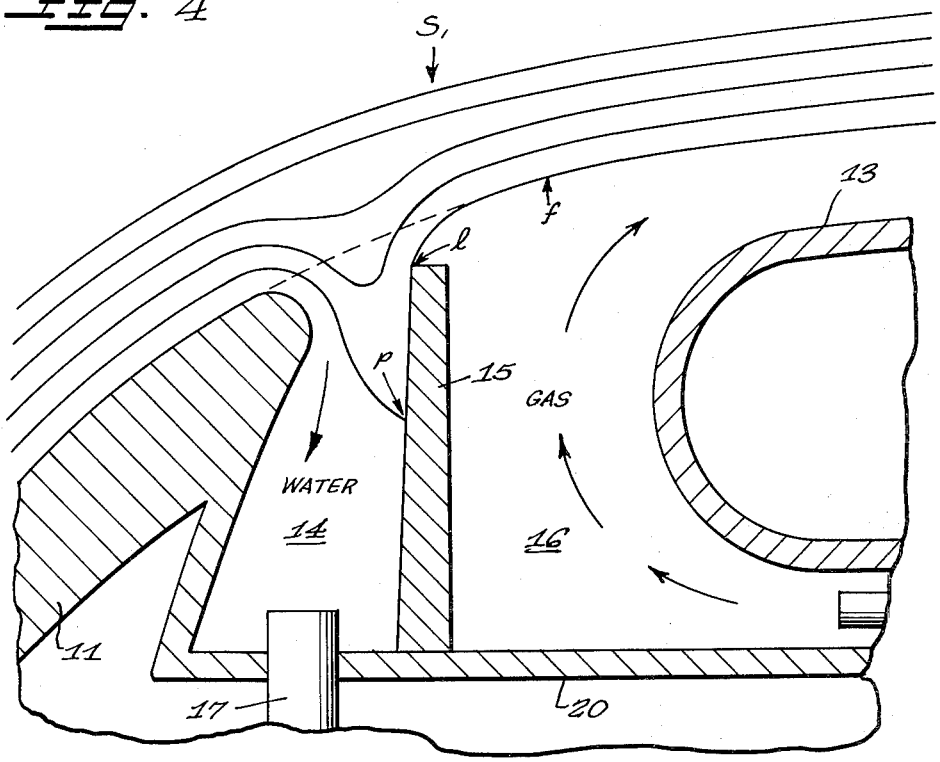
FIGURE 4 is a fragmentary sectional view on an enlarged scale showing detailed construction of a suitable means by which a gas film may be introduced onto the surface of the torpedo in such a fashion as to maintain a laminar water boundary.

A typical example of a torpedo is diagrammatically shown in the drawing. This underwater body 10 is in contact with the surrounding water over the surface area comprising its front nose 11. At S1, two adjacent annular recessed channels forming a gas injection slot extend completely around the body of the torpedo isolating the front nose portion 11 from the rest of the surface area 10a thereof. The purpose of this slot S1 is two-fold. First, it serves to remove all water boundary layer which has been created in the flow over the frontal nose surface and secondly it serves to introduce a gas film which flows backwardly over the surface of the rest of the torpedo to thereby isolate the rest of the torpedo from direct contact with the surrounding water. A typical configuration of the two adjacent annular channels suitable for accomplishing this purpose is shown in FIGURE 4 and will be discussed in detail below. This slot serves to remove all water boundary layer which has been created in the flow over the front nose and to introduce a gas film over the surface of the rest of the torpedo.

Figure 3:
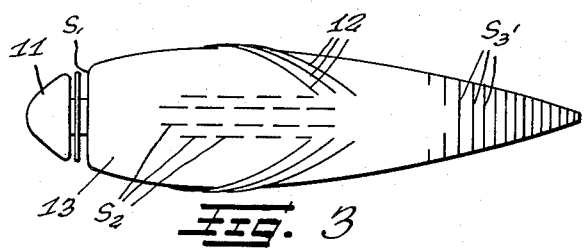
FIGURE 3 is a view looking upwardly at the bottom of the torpedo shown in FIGURE 1.

After this gas film has been introduced at S1, it has to be replenished by additional gas from slots S2 generally disposed on the bottom of the underwater body as seen by way of example in FIGURE 3. These blowing slots S2 may be arranged in various patterns but should have special geometric form (shown in detailed cross-section in FIGURE 5 and to be described below) such that they replenish the gas film thickness but provide a minimum of disturbance to the film. For instance, for a torpedo, the gas film must remain laminar and the flow in these blowing slots has, therefore, to be at a very low Reynolds number (based on the width W of the slot) such that the laminar flow of the gas film is not disturbed.

Figure 1:
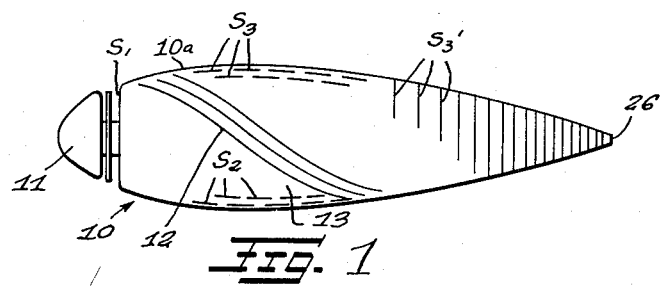
FIGURE 1 is a partially diagrammatic side elevational view of a torpedo constructed in accordance with the present invention.
Figure 2:
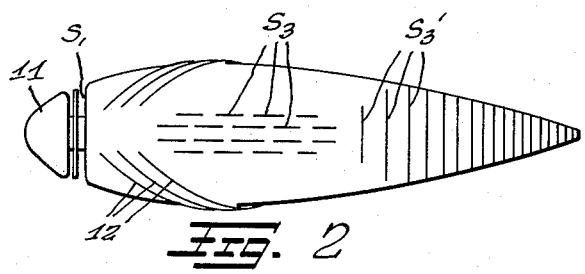
FIGURE 2 is a top view of the torpedo shown in FIGURE 1.

The underwater body 10 also has suction slots S3 on its top surface as shown in FIGURES 1 and 2. These suction slots remove gas from the film and are distributed in such a fashion as to keep the gas film thickness within specified limits. For instance, for a torpedo operating at normal speeds, the gas film height should be of the order of $1/1000$ foot.

Further back on the torpedo, more gas must be removed on the top than is introduced on the bottom. This begins to occur in the region where the water flow introduces a positive pressure gradient along the surface of the torpedo. Additional suction slots S3' are provided and may be positioned to run perpendicular to the axis of the torpedo as shown in FIGURES 1 and 2. However, the direction of these slots may vary from that shown provided they fulfill the function of keeping the gas film thickness at its predetermined values. These slots S3' extend more and more towards the bottom of the torpedo until toward the end of the torpedo, gas is also removed at the bottom of the body since the slots extend in annular fashion completely around the rearward end of the body.

As noted above, a second condition for stability is that the total shear stress acting from the gas upon the water surface must be minimized. In order to reduce the cross flow shear stress the underwater body may, for example, have very small fins or ridges 12 on the surface 13 of the body which is in back of annular slot S1 substantially as shown in FIGURE 1. These ridges 12 (which are shown in greater cross-sectional detail in FIGURE 6) may be conveniently extended from the top forward portion of the surface to the bottom rearward portion of the surface of the torpedo. These fins or ridges are of a height less than the total gas film height and are preferably spaced apart by a distance which is a multiple of their own height. The ridges or fins are thus entirely immersed in the gas film and do not come in direct contact with the water. They serve to deflect and direct the gas introduced through slot S1 and thereby to stabilize the gas water interface.

The details of construction of the annular slot S1 which extends around the forward surface of the torpedo in a locus defined by the intersection with the surface of the torpedo of a plane which is perpendicular to the axis of the torpedo are shown in FIGURE 4. As noted above, the purpose of this slot is to introduce the gas in such a fashion that practically no boundary layer exists in the water at the water-gas interface and in such a fashion that simultaneously the radius of curvature of the water-gas interface is concave seen from the gas side. These conditions are achieved by the device shown in cross-section in FIGURE 4. The water in which the submerged body travels is shown flowing from left to right. This water flowing over the front nose portion 11 of the surface of the torpedo has formed a boundary layer near the surface of the torpedo. In order to reduce the thickness of the boundary layer on the surface, it is preferable to form the nose of the torpedo so that the water boundary layer remains laminar. However, this is not a necessary condition for the functioning of the device of this invention. The boundary layer which has been formed on this nose portion is sucked off by a forwardly disposed channel or slot 14 forming one-half of the annular slot S1. The forward slot 14 sucks off the water in such a fashion that a stagnation point P is formed on the forward surface of a knife-edge 15 which extends angularly around the middle of slot S1 and divides it into the forward water slot 14 and the rearward gas introduction slot 16. Along the forward surface of the knife edge 15, the water accelerates rapidly from the stagnation point P to the edge or lip 1 (FIGURE 4) of the knife edge 15 where the water forms a free streamline. Because of the extremely small distance from the point P to the lip 1 and the relatively low average velocity (the velocity is high only over the very last part of this lip near the top of the knife edge) the boundary layer formed in the layer at 1 is so small that stability is assured.

In the channel 16 gas is introduced between the surface of the rearward portion 13 of the torpedo and the surrounding water. The gas supplied through channel 16 is in such a quantity that the free streamline, f, has a concave curvature of shape with respect to the axis of the torpedo, that is to say, so that the free streamline f is concave as seen from the gas side of the interface. The location of the knife edge or spike 15 and the quantity of the flow of gas as well as the quantity of water removed through channel 14 should be adjusted so that the streamline f follows essentially a predetermined streamline which is considered the exterior shape of the torpedo while the gas forms essentially a part of the torpedo. The equilibrium is adjusted by adjusting the projection of the spike of knife edge 15 radially outwardly toward the continuation of the surface of the frontal nose portion 11 substantially to the position indicated in FIGURE 4, that is, so that the lip 1 of the knife edge is slightly inside of the continuation of the surface of the frontal zone. This adjustment of the projection of the knife edge may be achieved by an original fixed dimensioning of the knife edge 15 or the knife edge may be formed so as to render it adjustable.

The water taken in through the channel or slot 14 may be withdrawn through a conduit or pipe 17 which extends through a suitable pumping system to a discharge point at the tail of the torpedo from which the water may be discharged to aid in propulsion. The gas supplied through channel 16, on the other hand, is pumped from a reservoir of any suitable type inside the torpedo and to which the gas taken in from the suction slot is preferably fed so that the gas through the channel 16 is essentially being recirculated.

Figures 5, 6:
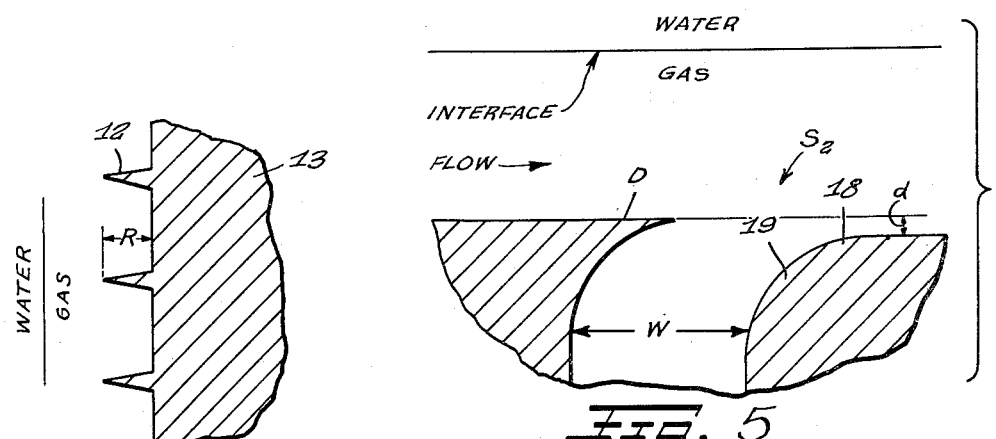
FIGURE 5 is a fragmentary sectional view on an enlarged scale showing the cross-sectional structure of the blowing slots found on the bottom of the torpedo.
FIGURE 6 is a fragmentary sectional view showing the cross-sectional structure of the gas deflecting ridges on the surface of the torpedo.

The slots S2, as shown in detail in FIGURE 5, must be of such a size and geometry that the gas introduced by them is at extremely low Reynolds number (based on the width W of the slot) and must have a geometry such that the laminar gas film flow of height $h$, which separates the water from the underwater body, is not disturbed. In particular, disturbance may lead to transition from laminar to turbulence flow in the gas film and must be avoided. This can, for instance, be achieved by the combination of the following factors as illustrated in FIGURE 5. The slot width W must be such that the Reynolds number based on this slot width is not larger than 10 but is preferably near 1. The left hand corner D of the slot is preferably overhanging as shown in FIGURE 5 and is in any event at least a sharp corner. The surface wall 18 to the right side (downstream in the gas flow) is slightly depressed by the amount or distance, $d$ (FIGURE 5), and the corner 19 of slot S2 leading to this surface is generously rounded as shown in FIGURE 5.

FIGURE 6 shows a fragmentary cross-sectional view on a greatly enlarged scale through the ridges shown, for example, in FIGURE 1. These ridges 12 should have a height indicated by the distance R in FIGURE 6, which is a fraction of the height of the gas film and extends at a relatively small angle with respect to the axis or meridional direction of the torpedo so that the total gas rate of flow from the top to the bottom of the torpedo is either zero or positive. As noted above, the ridges are preferably spaced apart a distance which is a multiple of their own height R. This spacing, as well as the height of the ridges should be calculated and selected to make the total rate of flow of gas from the top to the bottom of the torpedo either zero or positive for the particular application for which the torpedo is intended having in mind such factors as intended velocity and conditions of maneuverability.

In extremely long or large vehicles even the water flow over a gas film in time forms a water boundary layer which may become unstable. For vehicles where this occurs, it is sometimes desirable to provide a number of suction slots S4 (FIGURE 7) similar to the slot S1 spaced at intervals along the axial length of the body. Through such suction slots S4 as described above the gas boundary layer may be thinned to negligibly small values and at the place where the gas layer tends to zero the second of the intake slots S1 is positioned to remove the complete water boundary layer which has been formed in the water and to create a new and healthy (essentially boundary layerless) gas-water interface as described above in connection with the functioning of the structure of FIGURE 4. It should also be understood that the apparatus and techniques described above can be used wherever small friction is required with a simultaneous control of the pressures. For instance, this principle can be used in fluid lubricated journal bearings of any type.

Figure 1A:
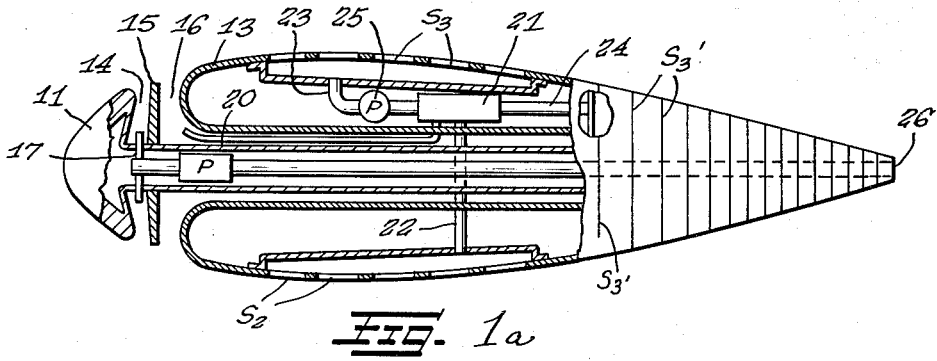
FIGURE 1a is a diagrammatic longitudinal sectional view (parts being shown in exaggerated size and not to scale for the sake of clarity) of the torpedo shown in FIG. 1.

It will, of course, be understood that the torpedo or underwater body 10 shown in the drawings is in its rearward portion 13 provided with essentially a double-walled surface, the indicated outer surface 13 being supported from and separated from the inner surface member 20 by any convenient or suitable supporting means. This double-walled structure and the interior components of the system are shown on a greatly exaggerated scale in the diagrammatic sectional view of FIGURE 1a. That is to say, it will be understood that the double surface, slots, duct work, pump and reservoir shown therein in fact occupy a far lesser proportion of the torpedo volume than would appear from the drawing. Thus, in FIGURE 1a the gas outlet duct 16 continues between the two members 13 and 20 to any convenient source of gas such as compressed air tank 21. The air tank or reservoir 21 is, of course, also connected by suitable duct work 22 to the blowing slots S2 on the bottom of the torpedo. As noted above, the suction slots S3 and S3′ may also be connected by suitable duct work 23 and 24 respectively to the intake of a pump 25 which may be used to replenish the compressed air tanks or in any other known manner to recirculate the gas forming the film over the rearward surface 13 of the torpedo 10. Furthermore, as noted above, the water taken in from the channel 14 in slot S1 is fed through a pipe or conduit 17 which may extend through the wall member 20 and which continues in any convenient manner axially through the torpedo 10 to discharge at the rearward tail portion 26 thereof. It is thus seen that direct contact between the ambient water and the surface of the torpedo exists only with respect to the frontal nose portion 11 and this rearward tail portion discharge area 26. Of course it will be understood that the gas film which covers the main body portion 13 of the torpedo is terminated at its rearward end in the angularly disposed suction slots S3' to gradually merge with the water discharge portion 26. It will further be understood, however, that the drawings are intended to diagrammatically or schematically illustrate merely one type apparatus suitable for carrying out the method of the present invention and that in practice the necessary apparatus can be far more compactly arranged to leave room for the other conventional components (not shown) in the torpedo or submarine.

In accordance with the above disclosed method, it is possible, by stabilizing the water-gas interface on the body of a torpedo, to reduce the propulsive power required by the torpedo by a factor in the range to 10 to 100 times and at the same time to reduce the noise created by the torpedo by more than 100 fold. The major problem in obtaining these gains in performance is the stabilization of the laminar water boundary layer which is separated from the torpedo skin by the gas layer. If this interface is stable the above-noted desirable operating results can be achieved.

There are two reasons which tend to lead to instability of the water-gas interface and which must be overcome in practice. The first of these is the Taylor instability which is exemplified by the instability of a gas layer on the bottom of a glass of water. This is the phenomenon wherein the gas breaks up into bubbles which rise to the surface in the glass. Generally, this kind of instability occurs whenever the body force acts in the direction from the denser fluid (water) toward the less dense fluid (gas). This is not necessarily the case on the top of the torpedo (or submarine) provided the centrifugal force exceeds the gravity.

The second reason tending toward instability is of the same nature as the instability which leads from a laminar water boundary layer to a turbulent one. It is clearly a function of the water boundary layer velocity profile and the Reynolds number in the water. The water boundary layer Reynolds number, based for instance on the displacement thickness of the water boundary layer, becomes smaller when the shear stress is reduced which is exerted on the water by the gas film everything else being equal. On a typical torpedo, a gas film of $1/100''$ thickness produces a shear stress on the torpedo which is so small (about $1/100$ of the shear stress which would exist in a laminar water boundary layer for the same torpedo without gas film) that the water boundary layer has a chance not to break up before the end of the torpedo. More particularly, even though the gas-water interface may tend to become unstable, the amplification of the instability wave does not lead to sufficiently large amplitude before the end of the torpedo to form water droplets.

It might be speculated that it is easy to increase the gas film thickness to a value where the shear stress is reduced so that essentially no water boundary layer is created and, as a consequence of the resulting low boundary layer Reynolds number, the water-gas interface would be expected to be stable. This argument is essentially correct except that the increase of gas film thickness is limited by the magnitude of cross-flow shear stress which can be tolerated. Indeed, due to gravity or angle of attack a pressure gradient exists which produces a motion in the gas perpendicular to the water velocity. This gas flow, which occurs from the bottom of the torpedo to the top has to be counteracted by admitting additional gas on the bottom of the torpedo and removing gas by suction slots at the top of the torpedo such that the gas film thickness on the bottom and top of the torpedo remains essentially the same. To be sure, for a gas thickness of 0.01" these quantities of gas added and removed for the control of the gas film thickness turn out to be extremely small. Nevertheless, this phenomenon sets a lower bound to the achievable values of longitudinal stresses acting on the gas-water interface because the cross-flow shear stresses increase with increasing thickness.

It must be emphasized that these shear stresses are already extremely small considering the drag which they produce, but their reduction by such means as the deflecting ridges discussed in detail above is of value because it is the stabilization of the gas-water interface to laminar flow which represents the central or basic problem involved in reducing drag on a submerged vehicle through the use of a lubricating fluid film.

It will be understood that modifications and variations may be effected without departing from the scope of the novel concepts of the present invention.

I claim as my invention:

1. The method of reducing the drag on a vehicle immersed in a liquid comprising, introducing a circumfluous gas film between said vehicle and said liquid, withdrawing said gas from certain points on the surface of said vehicle, continuously repeating said introducing and withdrawing steps to maintain a gas film of predetermined thickness around a major portion of the surface of said vehicle to stabilize a laminar liquid boundary layer and the liquid-gas interface between said layer and said film, and deflecting a part of said gas film at an angle to the direction of the velocity of said vehicle to reduce the magnitude of the shear stresses acting on said gas-water interface.

2. A method of reducing the drag on a vehicular body immersed in water comprising the steps of removing a boundary layer of water which has flowed over the front portion of the surface of this body at a point near the front of said body, introducing a circumfluous gas film around said body at said point so as to maintain the water-gas interface in a concave shape as seen from the gas side, said gas film being introduced in such a fashion that the liquid accelerates from a stagnation point to the point where said film is introduced to form a free streamline, withdrawing a portion of said circumfluous gas film from rearward portions of the surface of said body to maintain the thickness of said film at a predetermined value to stabilize a laminar water boundary layer and the water-gas interface between said layer and said film, and deflecting a portion of said gas film around said body at an angle to the direction of the velocity of said body to reduce the shear stresses acting on said gas-water interface.

3. In a vehicle adapted to operate entirely immersed in water, drag reducing apparatus comprising, means positioned near the front of said vehicle to introduce a gas film around a major portion of the surface thereof, gas withdrawal means associated with said vehicle to maintain the thickness of said film at a predetermined value, and gas deflecting means on at least a portion of the surface of said vehicle to reduce the shear stress exerted on said water by said gas film to maintain a laminar water boundary layer adjacent said film.

4. In a vehicle adapted to be operated entirely immersed in water, drag reducing and noise insulating apparatus comprising, annular slot means extending around said vehicle near the forward portion thereof, said slot means having at least one channel connected to a source of gas to introduce a circumfluous gas film around a major portion of the surface of said vehicle, additional gas introducing means positioned along the bottom surface of said vehicle, gas withdrawal means associated with said vehicle to maintain the thickness of said film at a predetermined value, and gas deflecting ridge means on the surface of said vehicle, said ridge means having a height less than said predetermined thickness of said gas film and being positioned to deflect said gas to reduce the shear stress exerted by said gas on said water to maintain a laminar water boundary layer adjacent said gas film.

5. In a vehicle adapted to operate entirely immersed in water, drag reducing and noise insulating apparatus comprising, annular slot means extending around said vehicle near the front end thereof, said slot means comprising first and second annular channels separated by an annular knife edge, said first channel being positioned forwardly of said knife edge and being connected to means for withdrawing the water boundary layer flowing over the front portion of the surface of said vehicle, said second annular channel being positioned rearwardly of said annular knife edge and being connected to means to supply gas to be introduced onto the surface of a major portion of said vehicle rearwardly of said annular slot, and gas withdrawal means positioned rearwardly of said annular slot to maintain said gas supplied through said slot in a film of predetermined thickness around the surface of said vehicle.

6. In a vehicle adapted to be operated entirely immersed in water, drag reducing and noise insulating apparatus comprising, an annular slot extending around the surface of said vehicle near the forward end thereof in a locus generally defined by the intersection of a plane perpendicular to the axis of said vehicle with said surface, said slot comprising first and second annular channels separated by an annular knife edge, said knife edge and the surface of said vehicle in back of said slot terminating short of the flow streamline projecting from the front surface of said vehicle, said first channel forwardly of said knife edge being connected to means to remove the boundary layer of water flowing over the front surface of said vehicle, said second channel being connected to means to introduce a gas film around the surface of said vehicle in back of said annular slot, said knife edge being shaped and positioned to form a free streamline of water flow adjacent to said gas film which is concave as seen from said gas film, means on the bottom surface of said vehicle to supply additional gas to said film, means on the top surface of said vehicle and additional means at the rear of said vehicle to withdraw gas from said film to maintain the thickness of said film at a predetermined value, and gas deflecting ridge means projecting outwardly from the surface of said vehicle to a height less than said predetermined thickness and extending along the surface of said vehicle at an angle to the axis of motion thereof to deflect the gas introduced into said film to reduce the shear stress exerted on said water by said gas film to maintain a laminar water boundary layer adjacent said film.

7. A method of reducing the drag on a vehicular body immersed in liquid comprising the steps of removing a boundary layer of liquid which has flowed over a portion of the surface of the body, introducing a circumfluous gas film around said body adjacent the region of removal of the boundary layer of liquid from the body so as to maintain a liquid gas interface in a concave shape seen from the gas side, said gas film being introduced in such a fashion that the liquid accelerates from a stagnation point to the point where said film is introduced, and withdrawing a portion of said circumfluous gas film from portions of the surface of said body spaced rearwardly from the region of introduction of the gas film around said body to maintain the thickness of said gas film at a predetermined value and stabilize a laminar liquid boundary layer and the liquid-gas interface between said layer and said film.

8. In a vehicle adapted to operate entirely immersed in liquid, drag reducing and noise insulating apparatus comprising, annular slot means extending around said vehicle, said slot means comprising first and second annular channels and an annular knife edge separating said channels, said first channel being positioned forwardly of said knife edge and being connected to means for withdrawing the liquid boundary layer flowing over the surface of the vehicle, said second annular channel being positioned rearwardly of said knife edge and being connected to means to supply gas to be introduced onto the surface of said vehicle rearwardly of said slot means, and gas withdrawal means positioned rearwardly of said annular slot means to maintain gas supplied through said second annular channel in a film of predetermined thickness around the surface of said vehicle.

References Cited in the file of this patent

UNITED STATES PATENTS

| 2,351,750 | Fawkes | June 20, 1944 |
| 2,561,303 | Whittle | July 17, 1951 |
| 2,608,171 | Pearce | Aug. 26, 1952 |
| 2,721,715 | Hoadley | Oct. 25, 1955 |

FOREIGN PATENTS

| 717,416 | Great Britain | Oct. 27, 1954 |
| 810,769 | Great Britain | Mar. 25, 1959 |

UNITED STATES PATENT OFFICE
CERTIFICATE OF CORRECTION

Patent No. 3,016,865                 January 16, 1962

Hans P. Eichenberger

It is hereby certified that error appears in the above numbered patent requiring correction and that the said Letters Patent should read as corrected below.

Column 5, lines 22, 24, 27 and 46, the designation of the lip should be shown as the twelfth letter of the alphabet "l", each occurrence.

Signed and sealed this 11th day of September 1962.

(SEAL)
Attest:

ERNEST W. SWIDER
Attesting Officer

DAVID L. LADD
Commissioner of Patents